(12) United States Patent
Spanton (10) Patent No.: US 10,966,282 B2
(45) Date of Patent: Mar. 30, 2021

(54) PROVIDING NETWORK ACCESS VIA MOBILE DEVICE PEER TO PEER SHARING

(71) Applicant: T-Mobile USA, Inc., Bellevue, WA (US)

(72) Inventor: Christopher Spanton, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 159 days.

(21) Appl. No.: 16/237,603

(22) Filed: Dec. 31, 2018

(65) Prior Publication Data
US 2020/0214081 A1 Jul. 2, 2020

(51) Int. Cl.
*H04W 88/04* (2009.01)
*G06Q 20/38* (2012.01)
*H04W 4/70* (2018.01)
*G06F 16/182* (2019.01)

(52) U.S. Cl.
CPC ........ *H04W 88/04* (2013.01); *G06F 16/1824* (2019.01); *G06F 16/1834* (2019.01); *G06Q 20/382* (2013.01); *H04W 4/70* (2018.02)

(58) Field of Classification Search
CPC ... H04L 65/601; H04L 65/602; H04L 67/306; H04L 67/30; H04W 4/18; H04W 4/00; H04W 88/04; H04W 4/70; G06F 16/1824; G06F 16/1834; G06Q 20/382
USPC ........................................................ 370/329
See application file for complete search history.

(56) References Cited

U.S. PATENT DOCUMENTS

| 2017/0264645 A1 | 9/2017 | Tipton et al. |
| 2018/0352599 A1* | 12/2018 | Bostick ................. H04W 48/16 |
| 2020/0136932 A1* | 4/2020 | Jangam .................... H04L 45/64 |

FOREIGN PATENT DOCUMENTS

| KR | 20140130501 A | 11/2014 |
| KR | 20160009599 A | 1/2016 |
| WO | 2018146373 A1 | 8/2018 |

OTHER PUBLICATIONS

Schwartz, D. et al., Dove Network, LLC. Dove Technical Whitepaper V.1.0, "A Decentralized Peer-To-Peer Network for the Transfer of Data," copyright 2018, 22 pages.
International Searching Authority, International Search Report and Written Opinion, PCT Patent Application PCT/US2019/068436, dated Apr. 29, 2020, 12 pages.
Raju, Saravanan et al., "Identity Management using Blockchain for Cognitive Cellular Networks," 2017 IEEE International Conference on Communications Jul. 31, 2017, 6 pages.

* cited by examiner

*Primary Examiner* — Rownak Islam
(74) *Attorney, Agent, or Firm* — Perkins Coie LLP (57) ABSTRACT

Systems and methods are described herein for providing mobile devices with peer to peer access to telecommunications networks. The network-based systems enable mobile devices associated with subscribers of the telecommunications networks to establish direct connections with other mobile devices (e.g., third party mobile devices of users that are not subscribers) over peer to peer (P2P) communication protocols. For example, a mobile device can, over a P2P connection, act as a Hotspot, Wi-Fi tether, or bridge for a third party or other mobile device requesting access to the networks.

20 Claims, 5 Drawing Sheets

PROVIDING NETWORK ACCESS VIA MOBILE DEVICE PEER TO PEER SHARING

BACKGROUND

Although many folks have consistent, regular access to the telecommunications networks for which they subscribe, there are times when that access is limited or non-existent. For example, many locations (in the United States and worldwide) are covered by one or a few networks, and other locations cannot provide useful or robust access, due to hindrances from topography or infrastructure.

Further, there are many different ways to subscribe to a network. A user can access services (e.g., voice, text, or data communications) provided by a network carrier as a pre-paid subscriber, a post-paid subscriber, or combinations of the two. There are various drawbacks with being a certain type of subscriber and attempting to access a network. For example, a post-paid subscriber can reach an associated data cap or limit for a certain period (e.g., a month), and be charged at high rates for any additional data before the period ends. As another example, a pre-paid subscriber can run out of a data bucket, and not be able to easily renew the subscription before next wanting to utilize services provided by the network.

BRIEF DESCRIPTION OF THE DRAWINGS

Embodiments of the present technology will be described and explained through the use of the accompanying drawings.

The drawings have not necessarily been drawn to scale. Similarly, some components and/or operations can be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments or implementations described. On the contrary, the technology is intended to cover all modifications, equivalents, and alternatives falling within the scope of the technology as defined by the appended claims.

DETAILED DESCRIPTION

Overview

Systems and methods are described herein for providing mobile devices with peer to peer access to telecommunications networks. The systems enable mobile devices associated with subscribers of the telecommunications networks to establish direct connections with other mobile devices (e.g., third-party mobile devices of users that are not subscribers) over peer to peer (P2P) communication protocols. For example, a mobile device can, over a P2P connection, act as a Hotspot, Wi-Fi tether, or bridge for a third party or other mobile device requesting access to the networks.

In some implementations, a mobile device, configured to share access to the telecommunications network with other mobile devices, can execute a smart contract via a blockchain (e.g., Ethereum) or another decentralized network. The smart contract can define various terms of use when sharing access to the telecommunications network. The terms can include the rate charged for access, the types of services (e.g. voice, messaging, data, and so on) to be shared to the mobile devices, the type of payment or credit to be provided to the sharing mobile device, and so on.

In other implementations, the network carrier providing the telecommunications network can facilitate connections between mobile devices requesting service and mobile devices sharing access to the telecommunications network. For example, the network carrier can include a server supporting a system that receives requests from mobile devices seeking access to the network, matching requesting devices to devices sharing access, and executing smart contracts or other agreements or mechanisms for establishing P2P connections between mobile devices when one device is sharing access to telecommunications services to another device.

Further, the network carrier can facilitate providing a requesting device with access to the telecommunications network via multiple different sharing devices. For example, the network carrier can match the requesting device with two or more devices sharing access and provide the requesting device with access via an aggregation of access over the two or more different sharing devices.

Thus, in some implementations, the systems enable users unable to connect to their home or primary networks with access to another network via peer to peer communications between the devices and other devices having access to the other network. The systems, therefore, can enable users to avoid roaming on a network or provide access in locations where network access is otherwise restricted or unavailable.

For example, a user, sitting in a park, would like to stream a movie via her tablet. Not having access to her telecommunications network while in the park (or not having access because the tablet is only configured for WLAN communications), she initiates a request to access a cellular or telecommunications network providing data communications to the park's location. A mobile device located nearby accepts the request, establishes a P2P connection between her tablet and the mobile device, and executes a smart contract that defines various terms of use for accessing the network via the P2P connection. Using the P2P connection, the user streams the movie to her tablet, enjoying the movie without having to leave the warm, comfortable environment in the park. At the same time, the user of the mobile device that shared access receives a gift card to a local coffee shop and proceeds to redeem her free coffee for sharing access to the network.

In the following description, and to provide a thorough explanation, numerous specific details provide a thorough understanding of embodiments of the present technology. It will be apparent, however, that embodiments of the present technology can be practiced without some of these specific details.

Examples of Suitable Network Environments

Figure 1:
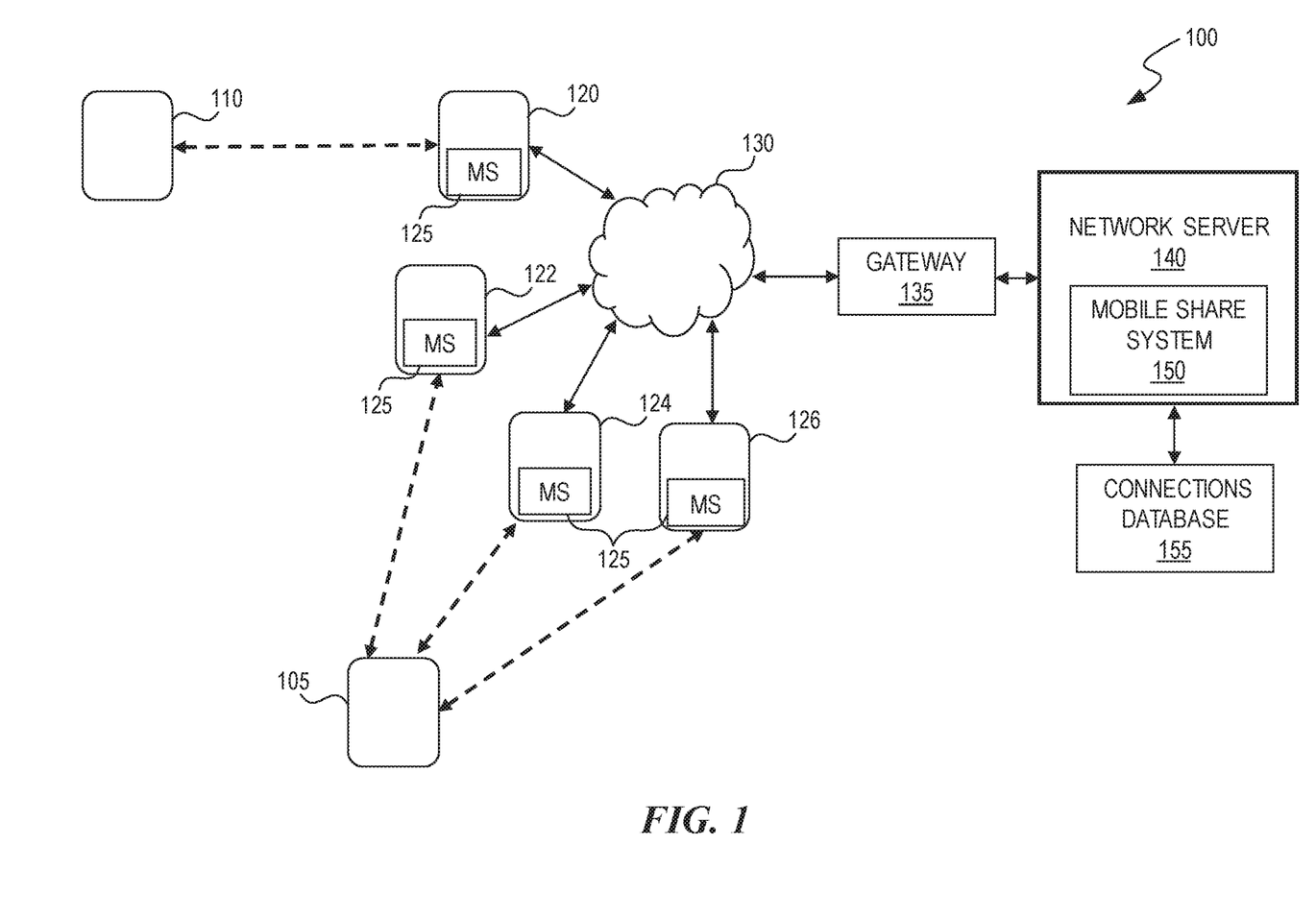
FIG. 1 is a block diagram illustrating a suitable computing environment for facilitating peer to peer network access between mobile devices.

As described herein, in some embodiments, the systems and methods ("present technology") utilize telecommunications network-based servers, components, engines, and/or processes, as well as mobile devices and associated applications, to enable the sharing of access to telecommunications networks between mobile devices, such as smartphones, tablets, and so on. FIG. 1 is a block diagram illustrating a suitable computing environment 100 for facilitating peer to peer network access between mobile devices.

A user of a mobile device 110 wants to access a telecommunications network 130 provided by a network carrier. The user of the mobile device 110 may want to access the network 130 to perform voice communications (e.g., voice or video calling), message communications (e.g., text or SMS services), data communications (e.g., streaming of audio, video, or other multimedia content), and so on. However, the user of the mobile device 110 is not a subscriber of the network carrier, and thus would access the network 130 by roaming on the network, if roaming were even available.

However, various mobile devices 120-126 (e.g., smartphones, tablets, or laptops) are associated with the telecommunications network 130, as they are associated with subscribers of the network carrier. Using the systems and methods described herein, these mobile devices 120-126 can share access to the network 130 by providing or establishing peer to peer (P2P) communications with the mobile device 110. For example, each of the devices can include a mobile share application ("MS" application) 125, script, or component that functions to establish the P2P communications between devices 120-126 and the mobile device 110. The devices 120-126 can establish, via the MS applications 125, direct and/or shared access to the telecommunications network 130 for the mobile device 110.

In some implementations, multiple mobile devices, such as mobile devices 122-126, can function to provide aggregated access via P2P communications to a third party mobile device. For example, a mobile device 105, unknown to the network 130, can request use of the network 130 for certain data-intensive services (e.g., streaming of large data files or content, certain video communications).

The devices 122-126, configured to share access to the network 130, can each establish a direct or P2P connection with the mobile device 105, and facilitate access to the network 130 (in some cases controlled by network servers). Via the combined or aggregated access to the network 130, the mobile device 105 can receive or transmit data or other communications over each of the P2P connections. Thus, no single device is burdened by facilitating all requested network services to the mobile device 110.

The MS applications 125 can perform certain functions before or during establishment of P2P connections between devices. The MS applications 125 can advertise their associated devices 120-126 to the mobile devices 110 or 105 as being available for shared access to the network 130 within a shared geographical location (e.g., a park, building, campus, event, or other location or structure). Further, the MS applications 125 can facilitate the execution of agreements, such as smart contracts on a blockchain or distributed ledger, which govern terms applied to agreements between the devices when sharing access to the network 130. In some cases, the MS applications 125 can directly access a blockchain representing the network 130 and execute a smart contract between the devices (e.g., between mobile device 110 and mobile device 120) that includes the terms of use (e.g., rates of use, payment terms, credit terms, and so on) between the parties.

In various implementations, the MS applications 125 can communicate with a network server 140 of the network carrier, which manages and executes the sharing of network access between devices using a network-based mobile share system 150. The MS applications 125 can access the server 140 via a gateway 135 or another network-based access component, which performs various authentication processes (e.g., via the OAuth 2.0 protocol), and routes communications to the network server 140, for handling network sharing requests and associated information. In some cases, the requesting mobile devices 110, 105 can also access the network server 140 to send requests and other information for shared access to the network 130.

The system 150 can manage and execute smart contracts between devices, as well as match devices with one another, depending on certain characteristics (static or dynamic) of the devices. For example, the mobile share system 150 can maintain various databases 155 that include entries for mobile devices 120-126, as well as other mobile devices configured to provide shared access to the network 130.

The entries include information identifying the mobile devices, a current location of the devices, a current use or operation of the devices (e.g., currently in use streaming a video or on a call), battery levels for the devices (e.g., including whether the devices are on battery power or charging), capabilities or functionalities supported by the devices, device type information, and so on. The system 150 can utilize such information when matching devices configured to share access to the network 130 to a requesting device, such as mobile device 110.

FIG. 1 and the discussion herein provide a brief, general description of a suitable computing environment in which the mobile devices 110, 105, 120-126, network server 140, and mobile share system 150 can be supported and implemented. Although not required, aspects of the network environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multiprocessor systems, microprocessor-based or programmable consumer electronics, set-top boxes, network PCs, mini-computers, mainframe computers, and the like. Indeed, the terms "computer," "host," and "host computer," are generally used interchangeably herein, as are "mobile device" and "handset," and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or another scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device can represent the server portion, while the server can represent the client portion.

In some embodiments, the devices can include network communication components that enable the devices to communicate with remote servers or other portable electronic devices by transmitting and receiving wireless signals using a licensed, semi-licensed, or unlicensed spectrum over communications network, such as network 130. In some cases, the telecommunication network 130 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Examples of Shared Network Access for Mobile Devices Using P2P Communications

Figure 2:
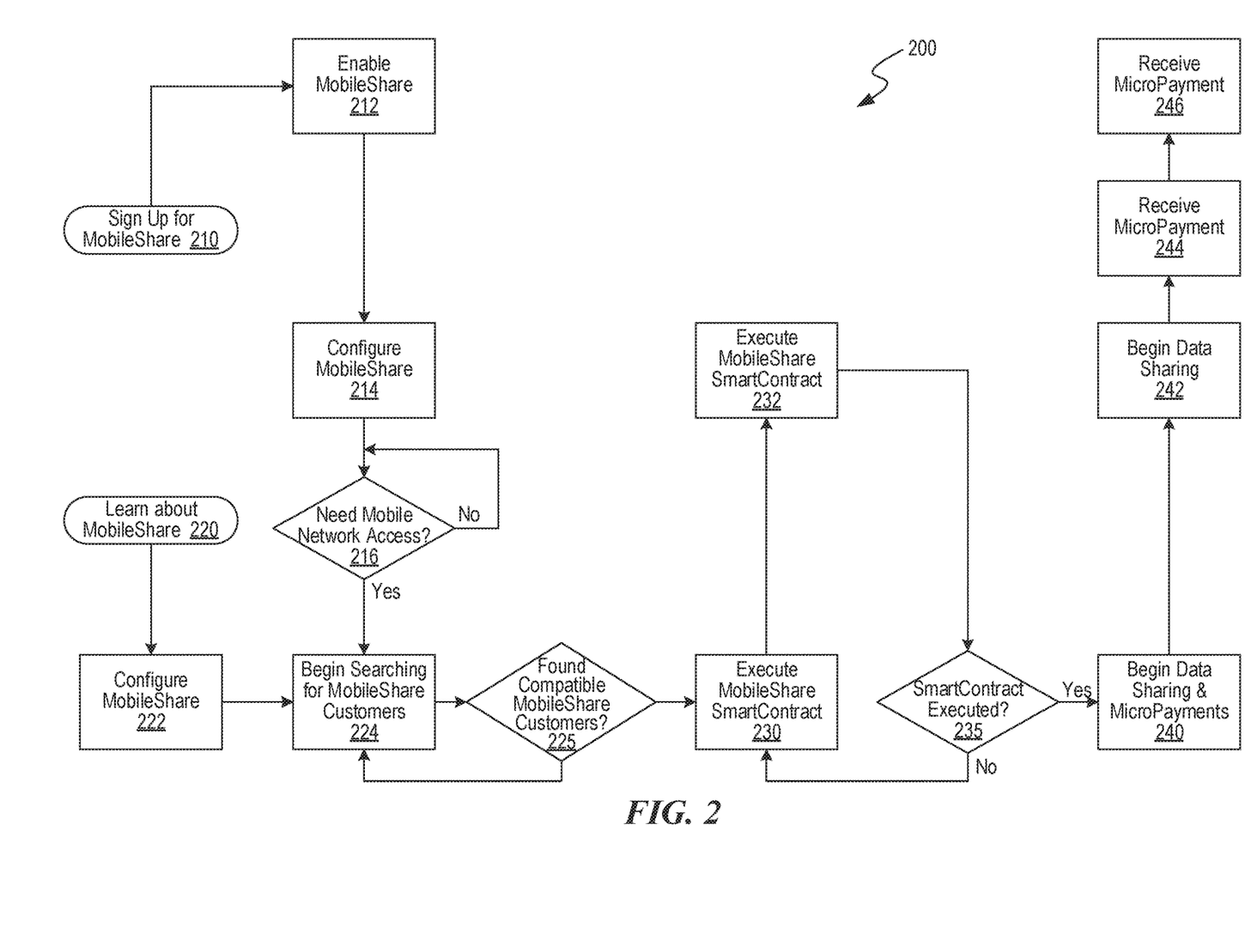
FIG. 2 is a flow diagram illustrating various communication flows between network devices.

As described herein, in some implementations, the mobile share system 150 and/or mobile share applications 125 enable users to access a network via peer to peer communications between the devices and other devices having access to the network. The network carrier facilitates the establishment of P2P communications for access to the network 130 via various devices, as described herein. FIG. 2 is a flow diagram illustrating various communication flows 200 between network devices.

First, in block 210, the mobile devices 110, 105 (which can be associated with a third party or users unknown to the network 130) can request to receive shared access to the network 130 via a sign-up or registration process with the mobile share system 150. In block 212, the system 150 enables the mobile devices 110, 105 to receive or benefit from shared access, such as by creating or updating an entry in the database 155 for the devices 110, 105. Then, the system 150, in block 214, provisions an application similar to the MS application 125 to the devices 110, 105 to enable network sharing via network devices, such as mobile devices 120-126. Once the application is configured and running on the devices 110, 105, the devices, in block 216, advertise or send their requests for shared access.

In parallel, the mobile devices 120-126, which can be known to the system 150, learn, in block 220, about the availability to share access to the network 130. The devices 120-126, in block 222, download and configure the MS application 125 to their devices. Both types of devices (requesting devices and sharing devices) are now configured and/or provisioned for performing P2P communications when sharing access to the network 130.

In block 224, the mobile devices 120-126, configured with the MS application 125 and capable of providing shared access to the network 130, advertise or otherwise make available their device information to devices 110, 105, which may need access to the network 130. For example, the mobile devices 120-126 can advertise as mobile Hotspots or Wi-Fi access points for a certain location or area.

In block 225, a device (e.g., one or more of mobile devices 120-126) identifies a third party device seeking access to the network 130, such as mobile device 110. Then, the device, in block 230, confirms an agreement between the device, executing a smart contract or another group of rights on a distributed ledger, such as a blockchain. For example, the mobile device 120 can identify the mobile device 110 as requesting access to the network 130, connect with the device 110, and generate and execute a smart contract that defines the terms of use of the device 120 as a P2P connection to the network 130.

As described herein, a smart contract, such as an Ethereum smart contract, is a protocol that facilitates, verifies, and/or enforces term and resulting performance of an agreement or transaction between parties, such as between device 110 and device 120 (and, perhaps, the system 150). For example, the executed smart contract can effectuate a micropayment (e.g., using cryptocurrency such as bitcoin) between the mobile device 110 and the mobile device 120 for the shared access to the network 130.

Further, the execution provides for the application of secure protocols to the information exchange between the devices. Via the smart contract, the devices may perform a handshake, verifying the authenticity of each device before a P2P connection is established.

In some implementations, the mobile share system 150 can manage and execute the smart contract or other agreement between the mobile device 110 and the mobile device 120 for sharing access to the network 130. The server 140 can receive information about the devices, including information identifying an agreed upon transaction between the parties (rates for the transaction, duration of the transaction, and so on). The system 150, upon accessing the information about the shared access between the devices, executes the smart contract governing the access transaction, and manages payment between devices.

In block 235, the mobile device 120 determines the smart contract is executed by both parties. Then, the mobile device 120, in block 240, establishes a P2P connection between the devices, and begins, in block 242, data sharing or other sharing of services provided by the network 130. For example, the device 120 can establish a Wi-Fi tether or bridge connection, via the device 120, to the network 130.

Once the sharing of the access to the network 130 has completed, the device 110, in block 242, or the system 150, in block 244, can process or provide a micropayment for the use of the device 120 as an access point to the network 130. For example, the micropayment can be a cryptocurrency transaction between parties, or can be facilitated by the network carries, such as via the mobile share system 150 in coordination with a network billing or charging system.

Thus, in some embodiments, the network 130, via associated devices or an internal system, enables mobile devices to access services provided by the network 130 via shared access with other devices known to the network 130. The internal system can be the mobile share system 150, supported by the internal server 140 of the network carrier.

As described herein the system 150 can facilitate access to the telecommunications network 130. The system 150 can include an access request module that receives information identifying a requesting mobile device requesting access to the telecommunications network and a sharing mobile device configured to provide the requesting mobile device access to the telecommunications network via peer to peer communications between the requesting mobile device and the sharing mobile device.

The system 150 can also include an execution module that executes a smart contract between the requesting mobile device, the sharing mobile device, and the network carrier providing the telecommunications network. Once the smart contract (or other transaction or communication) is executed or performed, the system 150, via a network provisioning module, provisions access to the telecommunications network 130 for the requesting mobile device via the peer to peer communications between the requesting mobile device and the sharing mobile device.

As described herein, the execution module can perform a blockchain operation to execute the smart contract on a blockchain associated with the telecommunications network. The smart contract can include certain terms, such as:
- a term defining a rate charged to the requesting mobile device to access the telecommunications network via the peer to peer communications between the requesting mobile device and the sharing mobile device;
- a term defining a credit provided to the sharing mobile device to provide the access to the telecommunications network via the peer to peer communications between the requesting mobile device and the sharing mobile device; and/or
- a term defining a percentage of the rate charged to the requesting device to be provided to the network carrier for facilitating the access the telecommunications network via the peer to peer communications between the requesting mobile device and the sharing mobile device.

Further, the system 150 can include a request authorization module that authorizes the requesting mobile device to access the requested telecommunications services via the peer to peer communications between the requesting mobile device and the sharing mobile device. For example, the system 150, can determine that the requesting mobile device intends to establish a virtual private network (VPN) or other complex communication protocol via the shared access, and deny or otherwise manage the request.

In some implementations, the mobile share system 150 can include various components or modules to manage the sharing of access to the network 130 via P2P communications between mobile devices. In other implementations, the mobile devices can include such components (e.g., via the MS applications 125).

Figure 3:
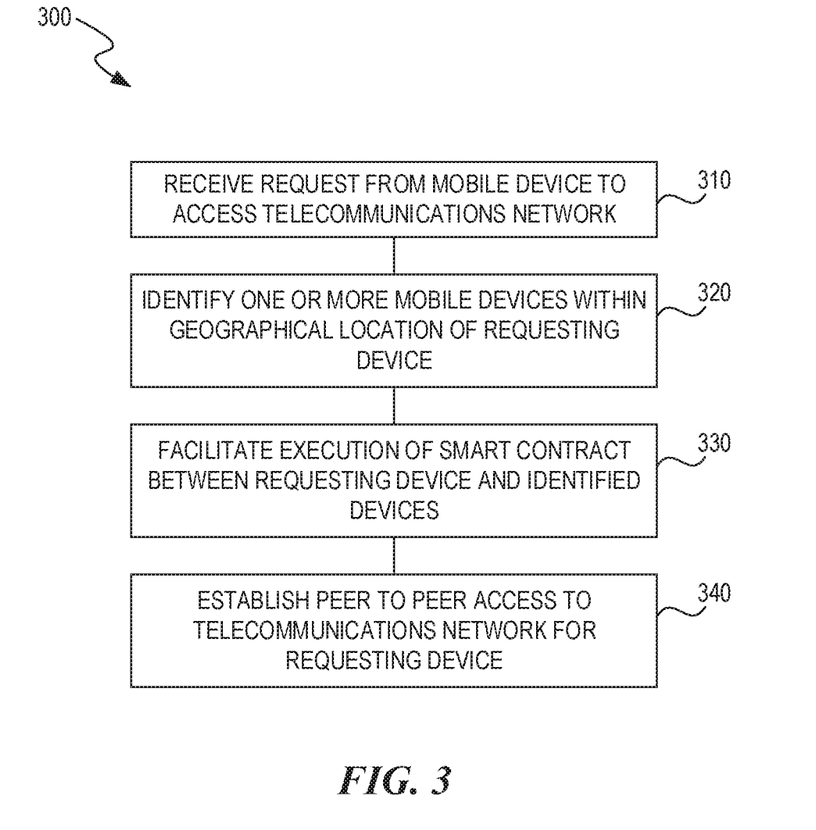
FIG. 3 is a flow diagram illustrating a method for providing telecommunications network access to a mobile device.

Thus, either the mobile devices or the system 150 can perform some or all of the process described herein and directed to providing shared access to the network 130. FIG. 3 is a flow diagram illustrating a method 300 for providing telecommunications network access to a mobile device. The method 300 can be performed by the mobile devices or the system 150 and, accordingly, is described herein merely by way of reference thereto. It will be appreciated that the method 300 can be performed on any suitable hardware or device In operation 310, the system 150 receives a request from a third party mobile device associated with a third party user that is not a subscriber of the telecommunications network to access the telecommunications network via the subscriber mobile device. For example, the system 150 can receive a request from the mobile device 110 to access the network 130.

In operation 320, the system 150 identifies one or more mobile devices at a location that includes the requesting device that are configured to share access to the network. For example, the system 150 identifies mobile device 120 as being available to provide access to the network 130.

In some cases, the system 150 can select a certain mobile device to provide shared access based on various known or dynamically changing characteristics assigned to the device (and stored in database 155). For example, the system 150 can match or select a mobile device based on a current location of the devices, a current use or operation of the devices (e.g., currently in use streaming a video or on a call), battery levels for the devices (e.g., including whether the devices are on battery power or charging), capabilities or functionalities supported by the devices, device type information, and so on. Once selected, the system 150 routes or otherwise transmits the request to the selected device.

In operation 330, the system 150 facilitates execution, by the subscriber mobile device, of a smart contract that defines terms between the subscriber mobile device and the third party mobile device. Execution of the smart contract facilitates access to the telecommunications network 130 for the subscriber mobile device via peer to peer communications between the subscriber mobile device and the third party mobile device.

The smart contract, as described herein, can define:
- types of communication services provided by the telecommunications network that are accessible by the third party mobile device over the established peer to peer connection;
- rates to be charged to the third party for accessing the communication services provided by the telecommunications network over the established peer to peer connection;
- credits to be provided to the subscriber of the telecommunications network for sharing access to the telecommunications network over the established peer to peer connection; and so on.

In operation 340, the system 150 (via the devices) establishes (or causes to establish) a peer to peer connection between the subscriber mobile device and the third party mobile device in response to the execution of the smart contract. For example, the system 150 enables the mobile device 120 to establish, via the MS application 125, a P2P connection with the mobile device 110. Once established, the mobile device 110 can communicate over the network 130 via the mobile device 120.

As described herein, some or all of the operations of method 300 can be performed by the mobile devices. For example, the MS application 125 of the sharing mobile device 120 can execute a smart contract on a blockchain, establish a P2P connection with mobile device 110, and/or manage micropayments between devices, without contacting the system 150.

Thus, in some embodiments, the systems and methods described herein enable users of mobile devices to mutually benefit from shared access to a network. The mobile devices can include a mobile application, such as the MS application 125, which facilitates the requesting of shared access, the advertisement of being an available device, as well as management of other user configurations or parameters.

Figure 4:
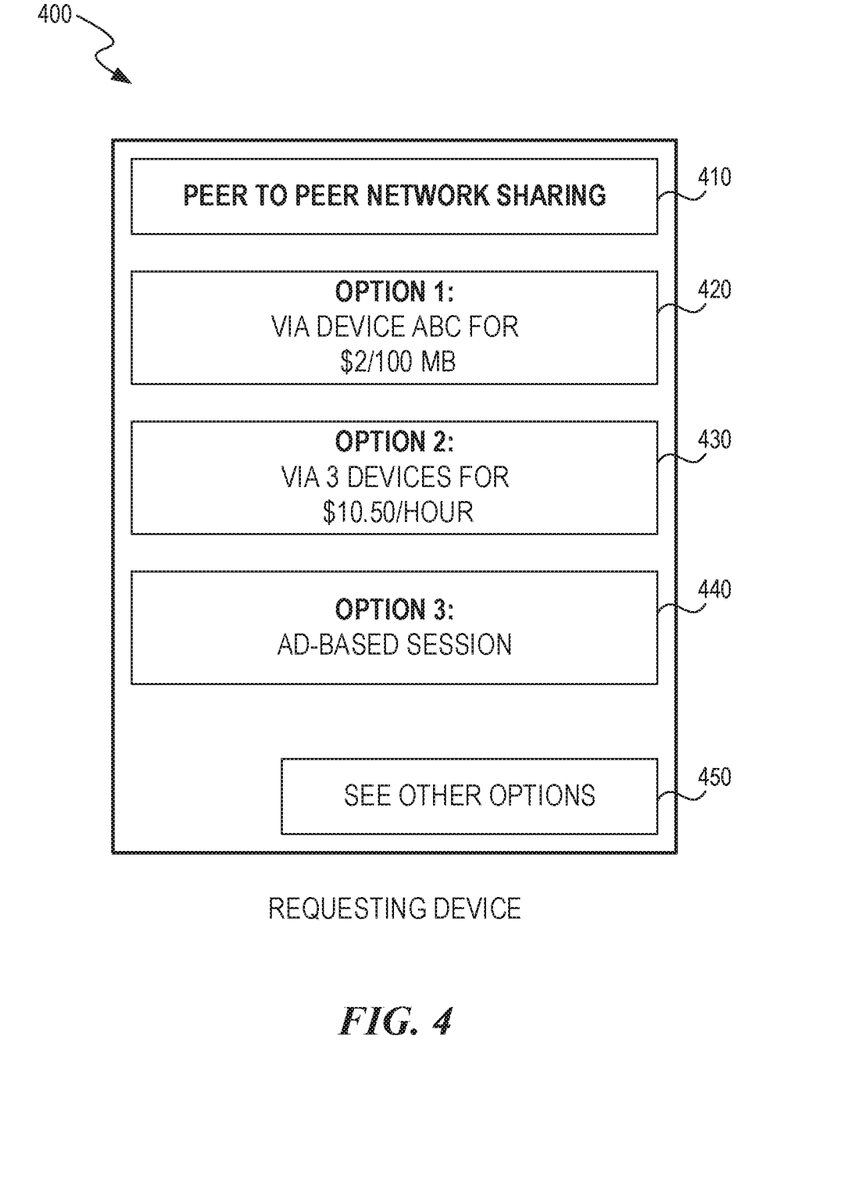
FIG. 4 is a display diagram illustrating an example user interface for a requesting device seeking access to a telecommunications network.

FIG. 4 is a display diagram illustrating an example user interface 400 for a requesting device seeking access to a telecommunications network. As depicted, a user can launch a peer to peer network sharing request 410. The application, using the processes described herein, identifies various options and/or devices for accessing the network 130, and presents the options to the user of the requesting device. These options include: an option 420 ("option 1") to pay a certain rate to share access via a certain mobile device (depicted with a pseudoanonymous identifier, an option 430 ("option 2") to pay a different rate for aggregated access to multiple devices, an option 440 ("option 3") to pay via another method, such as by periodically watching advertisements provided by the system 150, or an option 450 to check for more access options.

Figure 5:
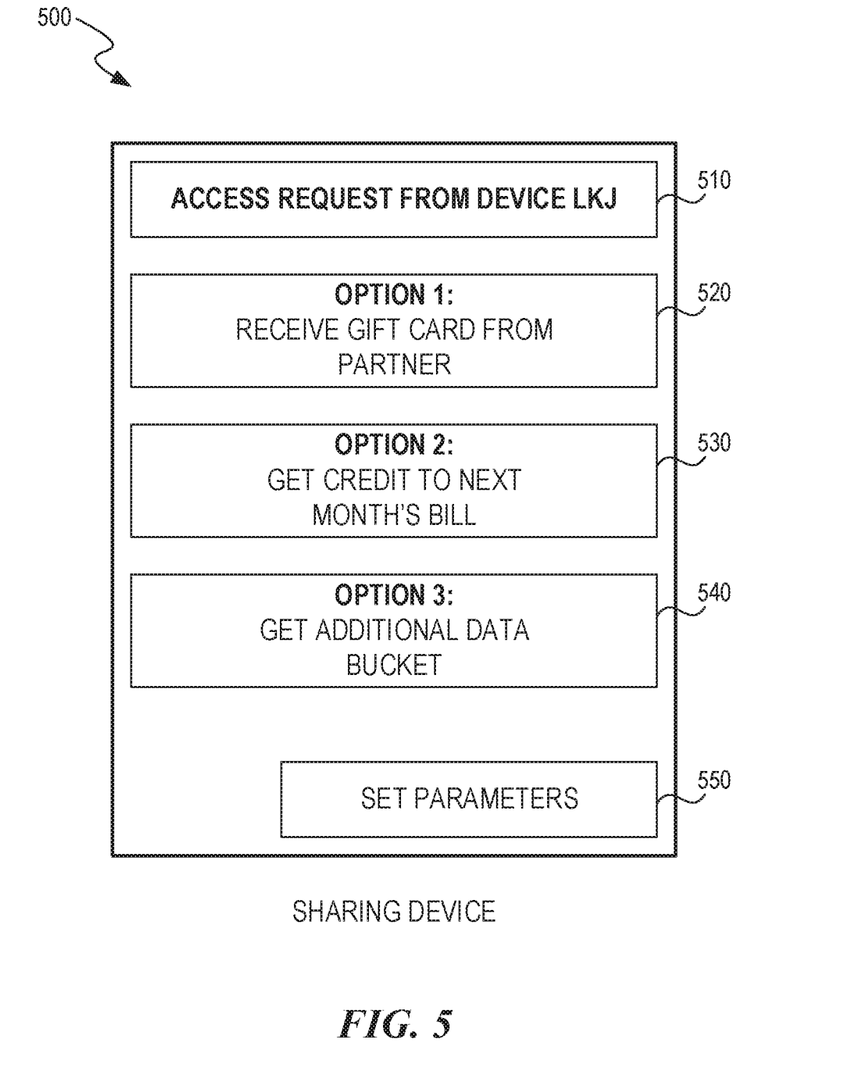
FIG. 5 is a display diagram illustrating an example user interface for a sharing device configured to provide peer to peer network access to a mobile device.

FIG. 5 is a display diagram illustrating an example user interface 500 for a sharing device configured to provide peer to peer network access to a mobile device. As depicted, the user can view various options for responding to a shared access request 510 from a third party mobile device. An associated application, using the processes described herein, identifies various options for being compensated for providing shared access to the network 130, and presents the options to the user of the requesting device. These options include: an option 520 ("option 1") to receive a gift card from a sponsor or partner company, an option 530 ("option 2") to receive a credit on a future bill (e.g., a data or payment credit), an option 540 ("option 3") to receive an additional data bucket, and so on.

Further, the user interface 500 can provide an option 550 for the user to set certain parameters associated with providing shared access, such as parameters that define time period in which the user is available to provide network sharing, parameters to define acceptable rates, parameters to define certain locations at which network sharing is to be made available, and so on.

Thus, in various implementations, a network enables mobile devices to access services provided by the network via shared access points or devices, such as via P2P communications between mobile devices. In doing so, the network facilitates efficient and enhanced access for unknown or third party mobile devices, while incentivizing its own subscribers to expand access to the network, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include not only additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of providing access to a telecommunications network, the method comprising:
   receiving, at a subscriber mobile device associated with a subscriber of the telecommunications network, a request from a third party mobile device associated with a third party user that is not a subscriber of the telecommunications network,
   wherein the request is to access the telecommunications network via the subscriber mobile device;
   displaying, via a graphical user interface of the subscriber mobile device, an indication of the received request from the third party mobile device and a set of selectable icons,
   wherein each icon in the set of selectable icons is associated with an option for compensation to be provided to the subscriber of the telecommunications network for sharing access to the telecommunications network;
   identifying a selection of an icon from the set of selectable icons;
   executing, by the subscriber mobile device, a smart contract that defines terms between the subscriber mobile device and the third party mobile device to facilitate access to the telecommunications network for the third party mobile device via peer to peer communications between the subscriber mobile device and the third party mobile device,
   wherein the smart contract includes terms, based on the identified selection of the icon from the set of selectable icons, for compensation to be provided to the subscriber of the telecommunications network; and
   establishing a peer to peer connection between the subscriber mobile device and the third party mobile device in response to the execution of the smart contract.

2. The method of claim 1, wherein executing the smart contract includes executing the smart contract on a blockchain associated with the telecommunications network and accessed by a mobile application of the subscriber mobile device that represents a node of the blockchain.

3. The method of claim 1, wherein executing the smart contract includes executing a group of terms that define:
   types of communication services provided by the telecommunications network that are accessible by the third party mobile device over the established peer to peer connection; and
   rates to be charged to the third party for accessing the communication services provided by the telecommunications network over the established peer to peer connection.

4. The method of claim 1, wherein executing the smart contract includes executing a group of terms that define:
   rates to be charged to the third party for accessing communication services provided by the telecommunications network over the established peer to peer connection; and
   credits to be provided to the subscriber of the telecommunications network for sharing access to the telecommunications network over the established peer to peer connection.

5. The method of claim 1, further comprising:
   sending, from the third party mobile device, the request to access the telecommunications network to an internal server associated with the telecommunications network;
   determining, at the internal server, that the subscriber mobile device is suitable to provide the third party mobile device with access to the telecommunications network via peer to peer communications when a data plan associated with the subscriber mobile device facilitates sharing access to the telecommunications network; and
   routing the request to the subscriber mobile device.

6. The method of claim 1, further comprising:
   sending, from the third party mobile device, the request to access the telecommunications network to an internal server associated with the telecommunications network;
   determining, at the internal server, that the subscriber mobile device is currently suitable to provide the third party mobile device with access to the telecommunications network via peer to peer communications when a current operation level of the subscriber mobile device is within a threshold level for providing peer to peer communications with other mobile devices; and
   routing the request to the subscriber mobile device.

7. The method of claim 1, further comprising:
   sending, from the third party mobile device, the request to access the telecommunications network to an internal server associated with the telecommunications network;
   determining, at the internal server, that the subscriber mobile device is currently suitable to provide the third party mobile device with access to the telecommunications network via peer to peer communications when a current battery level of the subscriber mobile device is within a threshold level for providing peer to peer communications with other mobile devices; and
   routing the request to the subscriber mobile device.

8. A non-transitory computer-readable medium whose contents, when executed by a subscriber mobile device, cause the subscriber mobile device to perform a method of providing access to a telecommunications network, the method comprising:
   receiving, at the subscriber mobile device associated with a subscriber of the telecommunications network, a request from a third party mobile device associated with a third party user that is not a subscriber of the telecommunications network to access the telecommunications network via the subscriber mobile device;
   displaying, via a graphical user interface of the subscriber mobile device, an indication of the received request from the third party mobile device and a set of selectable icons,
   wherein each icon in the set of selectable icons is associated with an option for compensation to be provided to the subscriber of the telecommunications network for sharing access to the telecommunications network;

identifying a selection of an icon from the set of selectable icons;

executing, by the subscriber mobile device, a smart contract that defines terms between the subscriber mobile device and the third party mobile device to facilitate access to the telecommunications network for the third party mobile device via peer to peer communications between the subscriber mobile device and the third party mobile device, wherein the smart contract includes terms, based on the identified selection of the icon from the set of selectable icons, for compensation to be provided to the subscriber of the telecommunications network; and establishing a peer to peer connection between the subscriber mobile device and the third party mobile device in response to the execution of the smart contract.

9. The non-transitory computer-readable medium of claim 8, wherein executing the smart contract includes executing the smart contract on a blockchain associated with the telecommunications network and accessed by a mobile application of the subscriber mobile device that represents a node of the blockchain.

10. The non-transitory computer-readable medium of claim 8, wherein executing the smart contract includes executing a group of terms that define:

types of communication services provided by the telecommunications network that are accessible by the third party mobile device over the established peer to peer connection; and rates to be charged to the third party for accessing the communication services provided by the telecommunications network over the established peer to peer connection.

11. The non-transitory computer-readable medium of claim 8, wherein executing the smart contract includes executing a group of terms that define:

rates to be charged to the third party for accessing communication services provided by the telecommunications network over the established peer to peer connection; and credits to be provided to the subscriber of the telecommunications network for sharing access to the telecommunications network over the established peer to peer connection.

12. The non-transitory computer-readable medium of claim 8, further comprising:

sending, from the third party mobile device, the request to access the telecommunications network to an internal server associated with the telecommunications network;

determining, at the internal server, that the subscriber mobile device is suitable to provide the third party mobile device with access to the telecommunications network via peer to peer communications when a data plan associated with the subscriber mobile device facilitates sharing access to the telecommunications network; and routing the request to the subscriber mobile device.

13. The non-transitory computer-readable medium of claim 8, further comprising:

sending, from the third party mobile device, the request to access the telecommunications network to an internal server associated with the telecommunications network;

determining, at the internal server, that the subscriber mobile device is currently suitable to provide the third party mobile device with access to the telecommunications network via peer to peer communications when a current operation level of the subscriber mobile device is within a threshold level for providing peer to peer communications with other mobile devices; and routing the request to the subscriber mobile device.

14. The non-transitory computer-readable medium of claim 8, further comprising:

sending, from the third party mobile device, the request to access the telecommunications network to an internal server associated with the telecommunications network;

determining, at the internal server, that the subscriber mobile device is currently suitable to provide the third party mobile device with access to the telecommunications network via peer to peer communications when a current battery level of the subscriber mobile device is within a threshold level for providing peer to peer communications with other mobile devices; and routing the request to the subscriber mobile device.

15. A system for providing access to a telecommunications network, comprising:

at least one hardware processor; and at least one memory coupled to the at least one hardware processor, wherein the at least one memory carries instructions that, when executed by the at least one hardware processor, cause the system to:

receive, at a subscriber mobile device associated with a subscriber of the telecommunications network, a request from a third party mobile device associated with a third party user that is not a subscriber of the telecommunications network, wherein the request includes a request to access the telecommunications network via the subscriber mobile device;

display, via a graphical user interface of the subscriber mobile device, an indication of the received request from the third party mobile device and a set of selectable icons, wherein each icon in the set of selectable icons is associated with an option for compensation to be provided to the subscriber of the telecommunications network for sharing access to the telecommunications network;

identify a selection of an icon from the set of selectable icons; and execute, by the subscriber mobile device, a smart contract that defines terms between the subscriber mobile device and the third party mobile device to facilitate access to the telecommunications network for the third party mobile device via peer to peer communications between the subscriber mobile device and the third party mobile device, wherein the smart contract includes terms, based on the identified selection of the icon from the set of selectable icons, for compensation to be provided to the subscriber of the telecommunications network; and establish a peer to peer connection between the subscriber mobile device and the third party mobile device in response to the execution of the smart contract.

16. The system of claim 15:

wherein the instructions cause the system to execute the smart contract on a blockchain associated with the telecommunications network and accessed by a mobile application of the subscriber mobile device that represents a node of the blockchain; and wherein the displayed set of selectable icons includes a selectable icon associated with the option for the subscriber to be compensated with one of a gift card, a credit on a future bill, or additional data.

17. The system of claim 15, wherein the instructions cause the system to execute a group of terms in the smart contract that define:
   types of communication services provided by the telecommunications network that are accessible by the third party mobile device over the established peer to peer connection; and
   rates to be charged to the third party for accessing the communication services provided by the telecommunications network over the established peer to peer connection.

18. The system of claim 15, wherein the instructions cause the system to execute a group of terms in the smart contract that define:
   rates to be charged to the third party for accessing communication services provided by the telecommunications network over the established peer to peer connection; and
   credits to be provided to the subscriber of the telecommunications network for sharing access to the telecommunications network over the established peer to peer connection.

19. The system of claim 15, wherein the instructions further cause the system to:
   send, from the third party mobile device, the request to access the telecommunications network to an internal server associated with the telecommunications network;
   determine, at the internal server, that the subscriber mobile device is suitable to provide the third party mobile device with access to the telecommunications network via peer to peer communications when a data plan associated with the subscriber mobile device facilitates sharing access to the telecommunications network; and
   route the request to the subscriber mobile device.

20. The system of claim 15, wherein the instructions further cause the system to:
   send, from the third party mobile device, the request to access the telecommunications network to an internal server associated with the telecommunications network;
   determine, at the internal server, that the subscriber mobile device is currently suitable to provide the third party mobile device with access to the telecommunications network via peer to peer communications when a current operation level of the subscriber mobile device is within a threshold level for providing peer to peer communications with other mobile devices; and
   route the request to the subscriber mobile device.

* * * * *